United States Patent [19]
Quattrociocchi

[11] 3,919,141
[45] Nov. 11, 1975

[54] ASBESTOS SUBSTITUTE

[75] Inventor: Eugene J. Quattrociocchi, Scotia, N.Y.

[73] Assignee: Schenectady Chemicals, Inc., Schenectady, N.Y.

[22] Filed: July 12, 1974

[21] Appl. No.: 488,203

[52] U.S. Cl. ............................................. 260/17.2
[51] Int. Cl.² ........................................... C08L 1/02
[58] Field of Search ................................. 260/17.2

[56] References Cited
UNITED STATES PATENTS

| | | | |
|---|---|---|---|
| 1,472,147 | 10/1923 | Bastian | 260/17.2 |
| 1,836,021 | 12/1931 | Gibbons | 162/168 |
| 2,042,679 | 6/1936 | Murray et al. | 106/22 |
| 2,970,121 | 1/1961 | Schmittberger | 260/17.2 |
| 3,230,187 | 1/1966 | Oldham | 260/6 |

OTHER PUBLICATIONS

66:56237n, Chem. Absts. "Glass – Compositions," Tracey.
Chem. Absts. 69:29923p, "Modified – Material," Saavedra S. A.

Primary Examiner—Donald E. Czaja
Assistant Examiner—Edward Woodberry
Attorney, Agent, or Firm—Cushman, Darby & Cushman

[57] ABSTRACT

Cotton rag pulp is used as a substitute for asbestos in a phenol-aldehyde molding composition.

6 Claims, No Drawings

ASBESTOS SUBSTITUTE

The present invention relates to rag filled phenol-aldehyde molding compositions.

Asbestos has been employed in the preparation of phenol-aldehyde molding compositions. However, it has the disadvantage of being relatively expensive and recently toxicity problems have been noted in working with asbestos.

Accordingly, it has been found desirable to employ substitutes for asbestos.

It has been found now that certain treated cotton rags can be used to replace asbestos as a filler in phenol-aldehyde molding composition. The molded products have extremely high flexural strengths and good coefficients of friction although they do not have as good wear and heat stability compared to asbestos. The flexural strengths are considerably superior to similar molded products made using cotton linters as the filler.

The treated rag filler can be from 50 to 80 percent based on the total of phenol aldehyde resin and filler.

The phenol aldehyde resins can be made from phenols such as phenol, m-cresol, m,p-cresol mixture, cresylic acid, mixtures of phenol and cresylic acid, xylenol, resorcinol, bisphenol A or any other phenol which will form thermosetting resins with aldehydes. As aldehydes there can be used for example formaldehyde, acetaldehyde, benzaldehyde, furfural, propionaldehyde, glyoxal, acrolein and crotonaldehyde. Preferably, there is employed a thermosetting phenol-formaldehyde resin or a phenol-formaldehyde novolak cured with a cross-linking agent, e.g., hexamethylene-tetramine or paraformaldehyde.

It has been found critical to use 100 percent cotton rags. Rags from synthetic polymers such as polyesters and nylons are not suitable. It is important to the success of the invention that the fibers be highly hydratable.

The cotton rags employed in the present invention are converted to pulp by a conventional paper making process. The rags are first cleaned, if necessary, then subjected to an alkaline treatment, e.g., with caustic soda or potassium hydroxide, to remove sizing agents and is then partially shredded and is next subjected to a further conventional mechanical pulping digestion which usually takes 10–12 hours. The process can be stopped at this point but preferably the pulp is subjected to Jordaning action to further reduce the fiber length of the rag scrap. The reason for the digestion and mechanical processing is to (1) clean the rags, (2) reduce them to desired fiber length and degree of fibrillation, and (3) hydrate the cellulose. The hydration is critical because it appears to produce a swelling of the cellulose which upon drying causes considerable shrinkage. It is this shrinkage that develops a closely knit fiber web that gives paper made from the pulp density and strength.

While preferably, the processing of the cottom rags includes the Jordaning treatment, the Jordaning can be omitted.

Stephenson "Pulp and Paper Manufacture" Vol. 2, Chapter 1, part 1, and Chapter 3 (1953, McGraw-Hill) are referred to as showing conventional conditions in the treatment of rags. The entire disclosure of the cited portions of Stephenson are hereby incorporated by reference.

The preferred process (and that employed in making the treated denim rag pulp of the working examples) starts with new, sorted, cleaned rags of 100 percent cotton. These rags are mechanically cut and blown to a cooker which is a large (approximately five foot diameter 20 foot or so length) revolving drum digester. Following the rag charge, water with detergent, caustic and steam are added. For every one pound of rags, there is added 1.3 pounds of water containing detergent and 0.02 pounds of solid sodium hydroxide. Steam is added to the scaled digester as rapidly as possible to provide heat and pressure. It usually takes 3.5 hours to reach 35 psig which is then held for five hours. Pressure is released by venting and usually takes about 20 minutes. The digester is drained of liquid for about four hours.

The pulp is dumped from the rotary digester into a beater. The beater provides mechanical shearing action which reduces fiber length and causes fibrillation. The beater also serves to wash the digestion liquor from the pulp. In the beater, water is added at the rate of 100 gallons per minute at a pH of 7.0 – 7.3 in order to reduce the pulp liquor pH from 10 – 12 at the start of the wash to 7.5–8 at the end of the wash. This requires four hours of washing and mechanical shearing. The length of this washing-beating cycle is governed by a test for freeness. Samples are periodically withdrawn and tested for freeness or drainage in a screened cylinder. Basically, a known volume of pulp is charged to a cylinder and inverted over a screen and the rate of drain of water is timed. The longer the beating, the shorter the fiber, the thicker the mat thereby the slower the water drain.

The pulp at this stage of processing is satisfactory for use in the present invention. However, preferably the pulp is passed through two Jordans which are conical, fine-bladed rotating shearing units which reduce fiber length even more for the purpose of developing high green strength during paper making. Once out of the second Jordan unit, the pulp normally goes to a paper making machine. However, in the process of the invention, the pulp is used at this point to make the filler of the invention.

In the working examples, the treatment of the denim rag pulp included the Jordaning treatment.

The resin, rag pulp and other ingredients (if employed) can be mixed either dry or wet. Dry mixing is preferred. If wet mixing is employed, the resin binder is diluted with solvent and the solution sprayed onto the pulp and the pulp dried to give a B-staged pulp ready for preforming.

Unless otherwise indicated, all parts and percentages are by weight.

Fybex is a fibrous reinforcing mineral form of potassium titanate manufactured by duPont. SP-8855 is a thermoplastic novolak resin which also contains hexamethylenetetramine. The base resin has a formaldehyde to phenol molar ratio of 0.7 to 1. There is also present 8 parts of hexamethylenetetramine for every 100 parts of novolak.

MOLDING COMPOUND APPLICATION

Several asbestos substitutes including rag pulp, kraft wood pulp, and cotton linters were utilized in the molding compounds listed below. All compounds were compared to that of an asbestos filled molding compound.

|                          | Control | 1  | 2  | 3  | 4  | 5  |
|--------------------------|---------|----|----|----|----|----|
| Treated Denim Rag Pulp   | —       | 5  | 10 | 42 | —  | —  |
| Kraft Wood Pulp          | —       | —  | —  | —  | 42 | —  |
| Cotton Linters (Fibrous) | —       | —  | —  | —  | —  | 42 |
| Diatomaceous Earth       | —       | 15 | 10 | 10 | 10 | 10 |
| Fybex                    | —       | 45 | 45 | 12 | 12 | 12 |
| Powdered Resin (SP-8855) | 35      | 35 | 35 | 36 | 36 | 36 |
| Whiteing (CaCO₃)         | 10      | —  | —  | —  | —  | —  |
| Asbestos (5K-04)         | 55      | —  | —  | —  | —  | —  |

All of the molding compounds listed above including the control were preformed at 5000 psi and then pressed at 3000 psi for 15 minutes at 320°F. The preforming qualities of compounds 1 and 2 were poor, but compounds 3, 4 and 5 were excellent when compared to the control. Compound 3 had exceptional qualities — it provided sharp contours which exceeded that of the control.

The flexural strengths at room temperature of the cured molding compounds are listed below: (compounds 1 and 2 are not included due to their poor preforming qualities).

|                                       | PSI    |
|---------------------------------------|--------|
| Control (asbestos)                    | 7,920  |
| Compound No. 3 (Treated Denim Rag Pulp) | 10,400 |
| Compound No. 4 (Kraft Wood Pulp)      | 7,250  |
| Compound No. 5 (Cotton Linters)       | 6,420  |

Since the flexural strength of molding compound 3 was so high, the frictional characteristics of the treated denim rag pulp were also investigated in various brake lining compounds.

| Wet Mix Formula |  |
|---|---|
| Treated Denim Rag Pulp | 50.0 Parts |
| Barytes | 30.0 Parts |
| Hexa | 2.2 Parts |
| Resin (liquid phenol-formaldehyde) | 22.0 Parts |
| Solvent | 27.5 Parts |

| Dry Mix Formula | | |
|---|---|---|
|  | Mix A | Mix B |
| Treated Denim Rag Pulp | 25 parts | 21.25 parts |
| Barytes | 15 parts | 8.25 parts |
| Glass Fibers ("RICS") |  | 3.75 parts |
| Hard Rubber Dust |  | 1.80 parts |
| Starch |  | 2.70 parts |
| Magnesium Oxide |  | 2.75 parts |
| Resin (Powder) SP-8855 | 11 parts | 11.00 parts |

Overall, the frictional properties of the three compounds were good. Coefficient of friction levels of 0.40 to 0.45 (cold friction) were obtained. However, the wear and the heat stability were not as good as those of a comparable asbestos formulation compound.

While the cotton rag pulp filled phenol-aldehyde resin compositions are especially suitable as replacement for asbestos filled phenol-aldehyde resins they can also be used in molding compositions in place of phenol-aldehyde resins filled with conventional fillers such as cotton fibers, wood flour, kraft fibers, rags, cloth, etc.

What is claimed is:

1. A phenol-aldehyde molding composition containing as a filler 100 percent cotton rag pulp, said pulp having been prepared by a process consisting essentially of (1) aqueous alkaline digestion of cotton rags to form a pulp followed by (2) mechanical shearing in aqueous medium to cause hydration and fibrillation of the pulp, and (3) subsequent drying of the pulp.

2. A molding composition according to claim 1 wherein a Jordaning step is included after the mechanical shearing in preparing the cotton rag pulp.

3. A molding composition according to claim 1 wherein the phenol-aldehyde resin is selected from the group consisting of (1) a thermosetting phenol-aldehyde resin and (2) a phenol-aldehyde novolak containing sufficient hardening agent to render it thermosetting.

4. A molding composition according to claim 3 wherein the phenol is phenol per se.

5. A molding composition according to claim 4 wherein the aldehyde is formaldehyde.

6. A molding composition according to claim 5, containing 80 to 50 percent of the filler based on the total of filler and resin.

* * * * *